(12) United States Patent
Krishnan et al.

(10) Patent No.: US 11,554,757 B2
(45) Date of Patent: Jan. 17, 2023

(54) VEHICLE SENSOR ASSEMBLY

(71) Applicant: Ford Global Technologies, LLC, Dearborn, MI (US)

(72) Inventors: Venkatesh Krishnan, Canton, MI (US); Ashley Lucas, Novi, MI (US); Rashaun Phinisee, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 634 days.

(21) Appl. No.: 16/558,782

(22) Filed: Sep. 3, 2019

(65) Prior Publication Data
US 2021/0061237 A1 Mar. 4, 2021

(51) Int. Cl.
*B60S 1/62* (2006.01)
*G01S 7/497* (2006.01)
*G01S 7/40* (2006.01)

(52) U.S. Cl.
CPC . *B60S 1/62* (2013.01); *G01S 7/40* (2013.01); *G01S 7/4043* (2021.05); *G01S 7/497* (2013.01); *G01S 2007/4977* (2013.01)

(58) Field of Classification Search
None
See application file for complete search history.

(56) References Cited

U.S. PATENT DOCUMENTS

| | | |
|---|---|---|
| 9,731,688 B2 | 8/2017 | Doorley et al. |
| 10,065,610 B2 | 9/2018 | Wakatsuki |
| 10,189,450 B2 | 1/2019 | Rice |
| 10,232,828 B2 | 3/2019 | Ekola et al. |
| 10,259,431 B1 * | 4/2019 | Ybarra ...................... B08B 3/02 |
| 2018/0009418 A1 | 1/2018 | Newman |
| 2018/0015907 A1 * | 1/2018 | Rice ...................... G05D 1/0088 |
| 2018/0017680 A1 | 1/2018 | Pennecot et al. |
| 2018/0244245 A1 * | 8/2018 | Schmidt ................... B60R 1/04 |
| 2018/0354468 A1 | 12/2018 | Krishnan et al. |
| 2018/0370500 A1 | 12/2018 | Garcia Crespo et al. |

FOREIGN PATENT DOCUMENTS

EP 2983955 B2 6/2019

* cited by examiner

*Primary Examiner* — Cristi J Tate-Sims
(74) *Attorney, Agent, or Firm* — Frank A. MacKenzie; Bejin Bieneman PLC (57) ABSTRACT

A sensor assembly includes a first sensor including a first cylindrical sensor window defining an axis; an annular member substantially centered around the axis, fixed relative to the first sensor, and supporting the first sensor; a second sensor fixed relative to the annular member and suspended from the annular member, the second sensor including a second cylindrical sensor window defining the axis; a first tubular ring fixed relative to the annular member and substantially centered around the axis, the first tubular ring including a plurality of first nozzles aimed at the first cylindrical sensor window; a second tubular ring fixed relative to the annular member and substantially centered around the axis, the second tubular ring including a plurality of second nozzles aimed at the second cylindrical sensor window; and two legs extending downward from the annular member and supporting the annular member.

18 Claims, 4 Drawing Sheets

VEHICLE SENSOR ASSEMBLY

BACKGROUND

Vehicles, including those configured for autonomous or semi-autonomous operation, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

A sensor assembly includes a first sensor including a first cylindrical sensor window defining an axis; an annular member substantially centered around the axis, fixed relative to the first sensor, and supporting the first sensor; a second sensor fixed relative to the annular member and suspended from the annular member, the second sensor including a second cylindrical sensor window defining the axis; a first tubular ring fixed relative to the annular member and substantially centered around the axis, the first tubular ring including a plurality of first nozzles aimed at the first cylindrical sensor window; a second tubular ring fixed relative to the annular member and substantially centered around the axis, the second tubular ring including a plurality of second nozzles aimed at the second cylindrical sensor window; and two legs extending downward from the annular member and supporting the annular member.

The legs may be disposed 180° circumferentially from one another relative to the axis. The sensor assembly may further include a housing supporting the legs and defining a vehicle-forward direction, and the legs may be disposed in a cross-vehicle direction from the axis.

The sensor assembly may further include a housing supporting the legs, and the legs may be elongated from the housing to the annular member, and the second sensor may include a bottom surface facing toward the housing and spaced from the housing.

The first tubular ring may be disposed below the first cylindrical sensor window, and the second tubular ring may be disposed above the second cylindrical sensor window.

The first tubular ring may include a first ring cavity fluidly connected to the first nozzles, and the second tubular ring may include a second ring cavity fluidly connected to the second nozzles. The sensor assembly may further include a supply line fluidly connected to the first ring cavity, and one of the legs may include a leg cavity, and the supply line may extend through the leg cavity. The sensor assembly may further include a reservoir spaced from the legs, and a pump positioned to draw fluid from the reservoir and supply the fluid through the supply line.

The sensor assembly may further include wiring electrically connected to the first sensor and to the second sensor, and one of the legs may include a leg cavity, and the wiring may extend through the leg cavity.

The first sensor may include a top surface and a plurality of first fins extending upward from the top surface, the second sensor may include a bottom surface and a plurality of second fins extending downward from the bottom surface. The sensor assembly may further include a housing supporting the legs and defining a vehicle-forward direction, and the first fins and the second fins may be elongated along the vehicle-forward direction.

The first nozzles may include first first nozzles and second first nozzles arranged in an alternating pattern around the first tubular ring, the first first nozzles may each have a direction of discharge in a radially inward and axial direction forming a first angle with the axis, the second first nozzles may each have a direction of discharge in a radially inward and axial direction forming a second angle with the axis, and the second angle may be different than the first angle.

The second nozzles may include first second nozzles and second second nozzles arranged in an alternating pattern around the second tubular ring, the first second nozzles may each have a direction of discharge in a radially inward and axial direction forming a first angle with the axis, the second second nozzles may each have a direction of discharge in a radially inward and axial direction forming a second angle with the axis, and the second angle may be different than the first angle.

The first and second nozzles may be shaped to spray fluid in a flat-fan pattern.

The first and second nozzles may each include a flat deflection surface and an outlet directed at the respective deflection surface.

The first nozzles may be substantially evenly spaced around the first tubular ring, and the second nozzles may be substantially evenly spaced around the second tubular ring.

The sensor assembly may further include first air nozzles positioned to discharge upward between the first tubular ring and the first cylindrical sensor window, and second air nozzles positioned to discharge downward between the second tubular ring and the second cylindrical sensor window. The first and second air nozzles may be oriented to discharge in directions parallel to the axis.

With reference to the Figures, a sensor assembly 32 for a vehicle 30 includes a first sensor 34 including a first cylindrical sensor window 36 defining an axis A; an annular member 38 substantially centered around the axis A, fixed relative to the first sensor 34, and supporting the first sensor 34; a second sensor 40 fixed relative to the annular member 38 and suspended from the annular member 38, the second sensor 40 including a second cylindrical sensor window 42 defining the axis A; a first tubular ring 44 fixed relative to the annular member 38 and substantially centered around the axis A, the first tubular ring 44 including a plurality of first nozzles 46, 48 aimed at the first cylindrical sensor window 36; a second tubular ring 50 fixed relative to the annular member 38 and substantially centered around the axis A, the second tubular ring 50 including a plurality of second nozzles 52, 54 aimed at the second cylindrical sensor window 42; and two legs 56 extending downward from the annular member 38 and supporting the annular member 38.

The sensor assembly 32 provides a simultaneously stable and elevated support for the first and second sensors 34, 40. The two legs 56 provide stable support along with a minimal obstruction of field of view. The legs 56 also provide a route for providing cleaning and electrical connection to the first and second sensors 34, 40. Furthermore, as described below, the sensor assembly 32 provides good vertical coverage when cleaning the first and second cylindrical sensor windows 36, 42. The sensor assembly 32 has a robust design without moving parts for distributing fluid from the first nozzles 46, 48 and second nozzles 52, 54; i.e., the first tubular ring 44 and second tubular ring 50, including the first nozzles 46, 48 and second nozzles 52, 54, have no moving parts. The sensor assembly 32 uses fluid for cleaning in an efficient manner.

Figure 1:
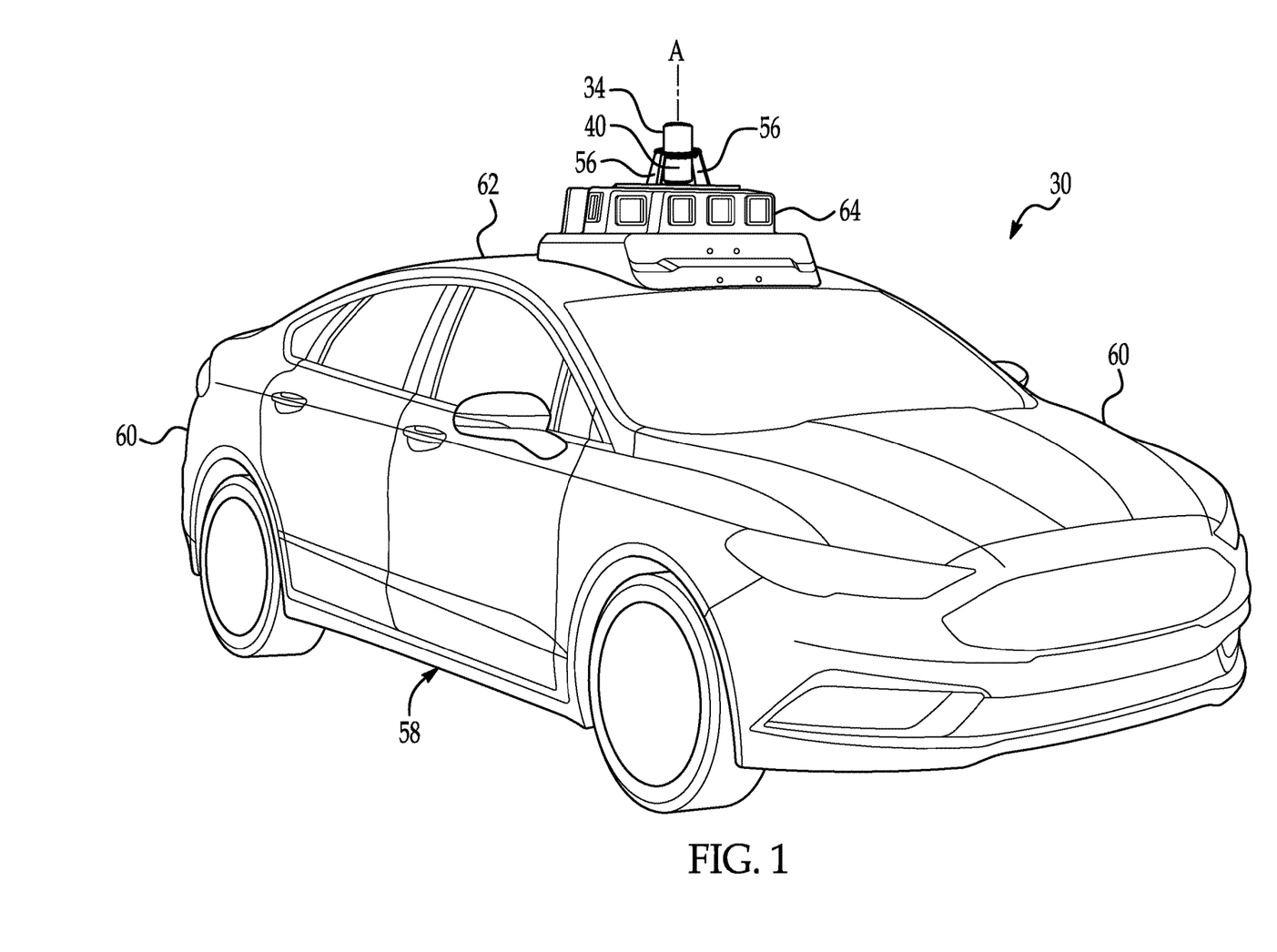
FIG. 1 is a perspective view of an example vehicle with an example sensor assembly.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate the propulsion, brake system, steering, and/or other vehicle systems based on data received from the first sensor 34 and the second sensor 40, as well as other sensors. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 58. The vehicle 30 may be of a unibody construction, in which a frame and the body 58 of the vehicle 30 are a single component. The vehicle 30 may, alternatively, be of a body-on-frame construction, in which the frame supports the body 58 that is a separate component from the frame. The frame and the body 58 may be formed of any suitable material, for example, steel, aluminum, etc. The body 58 includes body panels 60 partially defining an exterior of the vehicle 30. The body panels 60 may present a class-A surface, e.g., a finished surface exposed to view by a customer and free of unaesthetic blemishes and defects. The body panels 60 include, e.g., a roof 62, etc.

A housing 64 for supporting the first and second sensors 34, 40 is attachable to the vehicle 30, e.g., to one of the body panels 60 of the vehicle 30, e.g., the roof 62. For example, the housing 64 may be shaped to be attachable to the roof 62, e.g., may have a shape matching or following a contour of the roof 62. The housing 64 defines a vehicle-forward direction, e.g., is shaped to be attachable to the roof 62 of the vehicle 30 in only one orientation. The housing 64 may be attached to the roof 62, which can provide the first and second sensors 34, 40 with a field of view of an area around the vehicle 30 that is not obstructed by the body 58 of the vehicle 30. The housing 64 may be formed of, e.g., plastic or metal.

Figure 2:
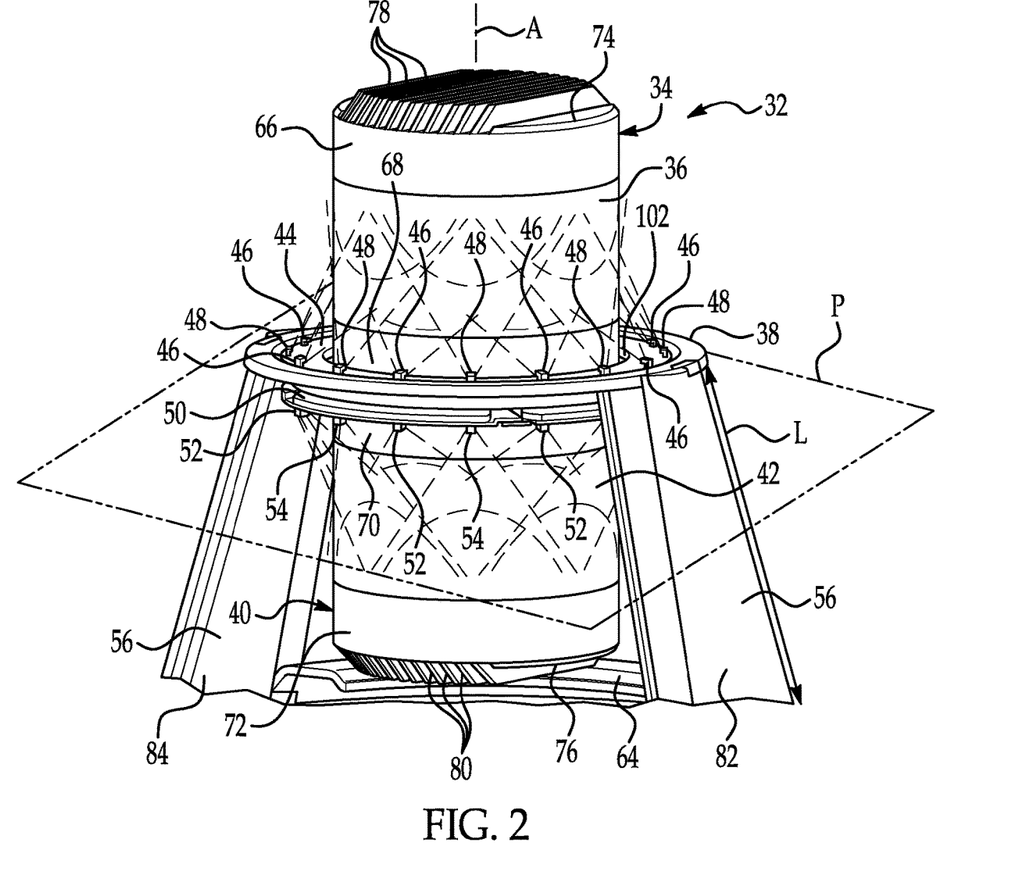
FIG. 2 is a perspective view of the sensor assembly.

With reference to FIGS. 1 and 2, the legs 56 extend downward from the annular member 38 to the housing 64. The legs 56 are elongated from the housing 64 to the annular member 38; i.e., each leg 56 has a cross-sectional shape (shown in FIG. 3) that is projected along a length L, and the length L of the leg 56 extends from the housing 64 to the annular member 38. The length L is significantly longer than the dimensions of the cross-section, e.g., a width W and thickness T.

The legs 56 are disposed in a cross-vehicle direction from the axis A and from one another; i.e., one of the legs 56 is directly left of the axis A relative to the vehicle 30, and the other of the legs 56 is directly right of the axis A relative to the vehicle 30. The legs 56 are disposed 180° circumferentially from one another relative to the axis A.

The legs 56 support the annular member 38, the first sensor 34, the second sensor 40, the first tubular ring 44, and the second tubular ring 50. For the purposes of this disclosure, "A supports B" means the weight of B is at least partially directed through A, and A thereby at least partially holds up B. The legs 56 fully support the annular member 38, the first sensor 34, the second sensor 40, the first tubular ring 44, and the second tubular ring 50; i.e., the legs 56 hold up and accept all of the weight of the annular member 38, the first sensor 34, the second sensor 40, the first tubular ring 44, and the second tubular ring 50. The housing 64 supports, specifically, fully supports, the legs 56, as well as the annular member 38, the first sensor 34, the second sensor 40, the first tubular ring 44, and the second tubular ring 50.

With reference to FIG. 2, the annular member 38 has a toroidal shape defining the axis A. The annular member 38 is substantially centered on the axis A. The annular member 38 is fixed relative to the first cylindrical sensor window 36 and relative to second cylindrical sensor window 42. For example, the annular member 38 is fixedly attached to the first sensor 34 and the second sensor 40, including the first cylindrical sensor window 36 and the second cylindrical sensor window 42.

The first and second sensors 34, 40 can detect the external world, e.g., objects and/or characteristics of surroundings of the vehicle 30, such as other vehicles, road lane markings, traffic lights and/or signs, pedestrians, etc. For example, the first and second sensors 34, 40 may be radar sensors, scanning laser range finders, light detection and ranging (LIDAR) devices, or image processing sensors such as cameras. In particular, the first and second sensors 34, 40 can be LIDAR devices. A LIDAR device detects distances to objects by emitting laser pulses and measuring the time of flight for the pulse to travel to the object and back.

The first sensor 34 includes a first upper sensor housing 66, a first lower sensor housing 68, and the first cylindrical sensor window 36. The first upper sensor housing 66 is disposed directly above the first cylindrical sensor window 36, and the first cylindrical sensor window 36 is disposed directly above the first lower sensor housing 68. The first upper sensor housing 66 is attached to and contacts the first cylindrical sensor window 36, and the first cylindrical sensor window 36 is attached to and contacts the first lower sensor housing 68. The first upper sensor housing 66 and the first lower sensor housing 68 are cylindrical and have outer diameters substantially equal to the outer diameter of the first cylindrical sensor window 36. The first sensor 34, specifically the first lower sensor housing 68, is mounted to the annular member 38. The first sensor 34 extends upward along the axis A from the annular member 38. The first sensor 34, specifically the first upper sensor housing 66, includes a top surface 74. The top surface 74 faces upward and directly away from the annular member 38.

The first cylindrical sensor window 36 is cylindrical and hollow. The first cylindrical sensor window 36 is substantially centered on the annular member 38; i.e., the first cylindrical sensor window 36 defines the axis A. The first cylindrical sensor window 36 has an outer diameter less than an outer diameter of the annular member 38. The first cylindrical sensor window 36 is transparent at least to, i.e., allows to substantially pass, a wavelength of light emitted by the first sensor 34. The first sensor 34 has a 360° horizontal field of view through the first cylindrical sensor window 36.

The second sensor 40 includes a second upper sensor housing 70, a second lower sensor housing 72, and the second cylindrical sensor window 42. The second upper sensor housing 70 is disposed directly above the second cylindrical sensor window 42, and the second cylindrical sensor window 42 is disposed directly above the second lower sensor housing 72. The second upper sensor housing 70 is attached to and contacts the second cylindrical sensor window 42, and the second cylindrical sensor window 42 is attached to and contacts the second lower sensor housing 72. The second upper sensor housing 70 and the second lower sensor housing 72 are cylindrical and have outer diameters substantially equal to the outer diameter of the second cylindrical sensor window 42. The second sensor 40, specifically the second upper sensor housing 70, is suspended from the annular member 38. The second sensor 40 extends downward along the axis A from the annular member 38. The second sensor 40, specifically the second lower sensor housing 72, includes a bottom surface 76. The bottom surface 76 faces downward and directly away from the annular member 38.

The second cylindrical sensor window 42 is cylindrical and hollow. The second cylindrical sensor window 42 is substantially centered on the annular member 38; i.e., the second cylindrical sensor window 42 defines the axis A. The second cylindrical sensor window 42 has an outer diameter less than an outer diameter of the annular member 38. The second cylindrical sensor window 42 is transparent at least to, i.e., allows to substantially pass, a wavelength of light emitted by the second sensor 40. The second sensor 40 has a 360° horizontal field of view through the second cylindrical sensor window 42, except where obstructed by the legs 56. Because the legs 56 are positioned in a cross-vehicle direction from the axis A, i.e., from the second cylindrical sensor window 42, the second sensor 40 has an unobstructed forward field of view and an unobstructed rearward field of view. The unobstructed forward field of view extends at least, e.g., 135° around the axis A, centered on the vehicle-forward direction. The unobstructed rearward field of view extends at least, e.g., 135° around the axis A, centered on the vehicle-rearward direction.

The top surface 74 includes a plurality of first fins 78, and the bottom surface 76 includes a plurality of second fins 80. The first fins 78 extend upward from the rest of the top surface 74, and the first fins 78 are oriented parallel to each other. The second fins 80 extend downward from the rest of the bottom surface 76, and the second fins 80 are oriented parallel to each other. The first and second fins 78, 80 can be elongated along the vehicle-forward direction. The first and second fins 78, 80 are thermally conductive, i.e., have a high thermal conductivity, e.g., a thermal conductivity equal to at least 15 watts per meter-Kelvin (W/(m K)), e.g., greater than 100 W/(m K), at 25° C. For example, the first and second fins 78, 80 may be aluminum.

The first tubular ring 44 has a toroidal shape defining the axis A, and the second tubular ring 50 also has a toroidal shape defining the axis A. The first and second tubular rings 44, 50 are each substantially centered on the axis A. The first and second tubular rings 44, 50 each have a tubular shape extending along the respective toroidal shape. The first and second tubular rings 44, 50 are fixed relative to the annular member 38. For example, the first tubular ring 44 is fixedly attached to the annular member 38 on a top side of the annular member 38, and the second tubular ring 50 is fixedly attached to the annular member 38 on a bottom side of the annular member 38. The first tubular ring 44 is disposed below the first cylindrical sensor window 36 and above the annular member 38, i.e., between the first cylindrical sensor window 36 and the annular member 38 along the axis A. The second tubular ring 50 is disposed above the second cylindrical window and below the annular member 38, i.e., between the second cylindrical sensor window 42 and the annular member 38 along the axis A. The first and second tubular rings 44, 50 each have an outer diameter less than or equal to the outer diameter of the annular member 38, and the first and second tubular rings 44, 50 each have an inner diameter greater than or equal to the inner diameter of the annular member 38.

Figure 3:
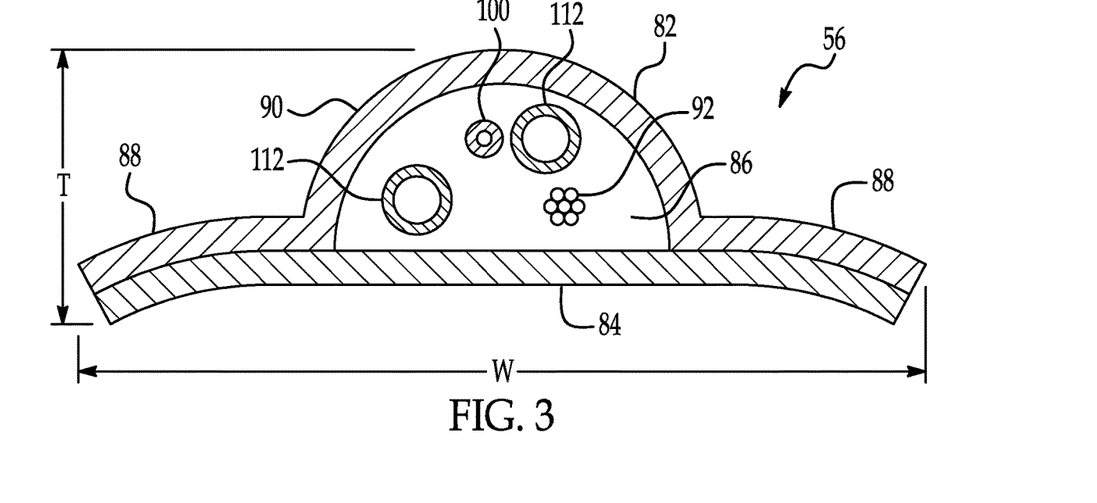
FIG. 3 is a cross-sectional view of a leg of the sensor assembly.

With reference to FIG. 3, each leg 56 includes an outer leg panel 82 and an inner leg panel 84. The outer and inner leg panels 82, 84 enclose and define a leg cavity 86. The outer leg panel 82, the inner leg panel 84, and the leg cavity 86 extend the full length L of the leg 56. The outer leg panel 82 includes two attachment sections 88 and an arch section 90. The attachment sections 88 are spaced from each other, and the arch section 90 extends from one of the attachment sections 88 to the other of the attachment sections 88. The attachment sections 88 and the arch section 90 extend the full length L of the leg 56. The attachment sections 88 contact and are attached to the inner leg panel 84. The arch section 90 is spaced from the inner leg panel 84 and partially forms the leg cavity 86.

Wiring 92 is electrically and physically connected to the first sensor 34 and to the second sensor 40. The wiring 92 extends from the housing 64 through the leg cavity 86 to the first sensor 34 and to the second sensor 40. The wiring 92 can supply power to the first and second sensors 34, 40 and/or transfer information to and from the first and second sensors 34, 40.

Figure 4:
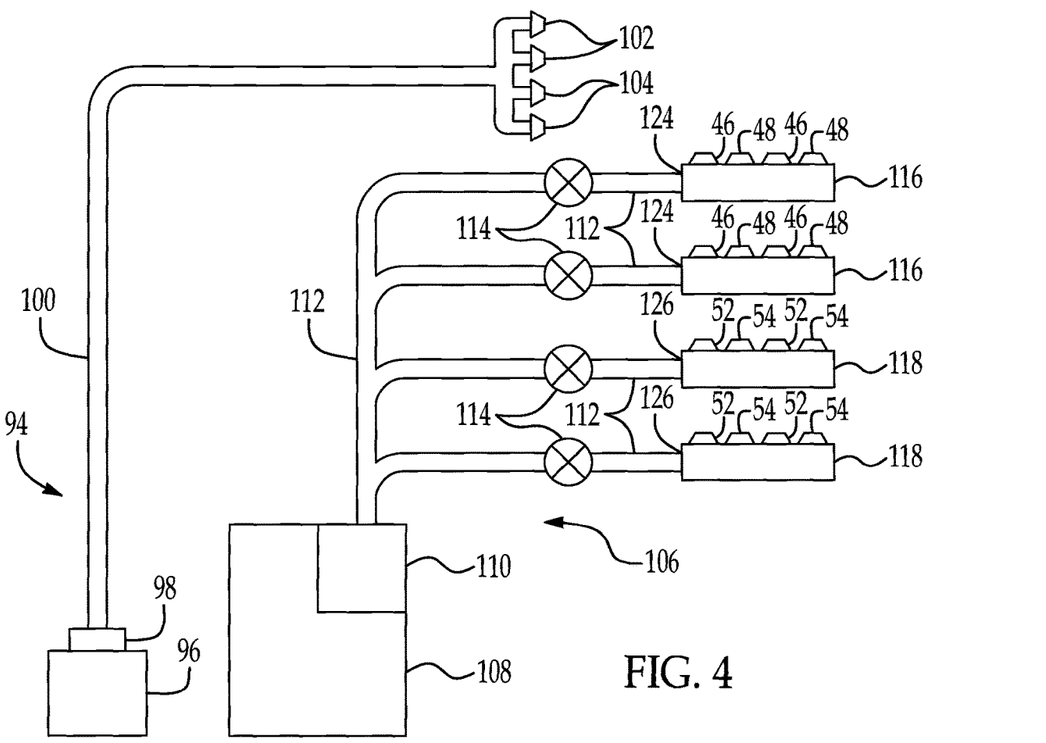
FIG. 4 is a diagram of a cleaning system of the sensor assembly.

With reference to FIG. 4, an air cleaning system 94 includes a compressor 96, a filter 98, air supply lines 100, first air nozzles 102, and second air nozzles 104. The compressor 96, the filter 98, and the air nozzles 102, 104 are fluidly connected to each other (i.e., fluid can flow from one to the other) in sequence through the air supply lines 100.

The compressor 96 increases the pressure of a gas by, e.g., forcing additional gas into a constant volume. The compressor 96 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 98 removes solid particulates such as dust, pollen, mold, dust, and bacteria from air flowing through the filter 98. The filter 98 may be any suitable type of filter, e.g., paper, foam, cotton, stainless steel, oil bath, etc.

The air supply lines 100 extend from the compressor 96 to the filter 98 and from the filter 98 to the air nozzles 102, 104. The air supply lines 100 may be, e.g., flexible tubes. The air supply lines 100 extend from the housing 64 through the leg cavity 86 to the annular member 38, as shown in FIG. 3.

The first air nozzles 102 are positioned to discharge between the first tubular ring 44 and the first lower sensor housing 68. The first air nozzles 102 are positioned radially between the first cylindrical sensor window 36 and the first tubular ring 44, i.e., farther from the axis A than the first cylindrical sensor window 36 and closer to the axis A than the first tubular ring 44. The first air nozzles 102 are oriented to discharge in a direction parallel to the axis A, e.g., vertically upward. The first air nozzles 102 are positioned below the first cylindrical sensor window 36 and are arranged circumferentially around the first cylindrical sensor window 36.

The second air nozzles 104 are positioned to discharge between the second tubular ring 50 and the second upper sensor housing 70. The second air nozzles 104 are positioned radially between the second cylindrical sensor window 42 and the second tubular ring 50, i.e., farther from the axis A than the second cylindrical sensor window 42 and closer to the axis A than the second tubular ring 50. The second air nozzles 104 are oriented to discharge in a direction parallel to the axis A, e.g., vertically downward. The second air nozzles 104 are positioned above the second cylindrical sensor window 42 and are arranged circumferentially around the second cylindrical sensor window 42.

A liquid cleaning system 106 of the vehicle 30 includes a reservoir 108, a pump 110, liquid supply lines 112, valves 114, the first nozzles 46, 48, and the second nozzles 52, 54. The reservoir 108, the pump 110, the valves 114, and the first nozzles 46, 48 and second nozzles 52, 54 are fluidly connected to each other (i.e., fluid can flow from one to the other). The liquid cleaning system 106 distributes washer fluid stored in the reservoir 108 to the first nozzles 46, 48 and second nozzles 52, 54. "Washer fluid" refers to any liquid stored in the reservoir 108 for cleaning. The washer fluid may include solvents, detergents, diluents such as water, etc.

The reservoir 108 may be a tank fillable with liquid, e.g., washer fluid for window cleaning. The reservoir 108 may be disposed in a front of the vehicle 30, specifically, in an engine compartment forward of a passenger cabin. Alternatively, the reservoir 108 may be disposed inside the housing 64. In either location, the reservoir 108 is spaced from the legs 56, i.e., not disposed in the legs 56 or contacting the legs 56. The reservoir 108 may store the washer fluid only for supplying the sensor assembly 32 or also for other purposes, such as supply to the windshield.

The pump 110 may force the washer fluid through the liquid supply lines 112 to the valves 114 and then to the first nozzles 46, 48 and second nozzles 52, 54 with sufficient pressure that the washer fluid sprays from the first nozzles 46, 48 and second nozzles 52, 54. The pump 110 is fluidly connected to the reservoir 108. The pump 110 is positioned to draw washer fluid from the reservoir 108 and supply the washer fluid through the liquid supply lines 112. For example, the pump 110 may be attached to or disposed in the reservoir 108.

The liquid supply lines 112 extend from the pump 110 to the valves 114 and from the valves 114 to the first nozzles 46, 48 and second nozzles 52, 54. The liquid supply lines 112 extend from the housing 64 through the leg cavity 86 to the first tubular ring 44 and second tubular ring 50, as shown in FIG. 3. The liquid supply lines 112 may be, e.g., flexible tubes.

The valves 114 are independently openable and closable, to permit the washer fluid to flow through or to block the washer fluid; i.e., each valve 114 can be opened or closed without changing the status of the other valves 114. The valves 114 may be any suitable type of valve, e.g., ball valve, butterfly valve, choke valve, gate valve, globe valve, etc. The valves 114 can be located in the housing 64 or in the annular member 38.

Returning to FIG. 2, the annular member 38 defines a plane P, and the second tubular ring 50 can be a reflection of the first tubular ring 44 over the plane P. Accordingly, the second nozzles 52, 54 can be a reflection of the first nozzles 46, 48 over the plane P, second ring cavities 118 can be a reflection of first ring cavities 116 over the plane P (described below), and second inlets 126 can be a reflection of first inlets 124 over the plane P (described below). FIGS. 5-7B illustrate the first tubular ring 44, the first nozzles 46, 48, the first ring cavities 116, and the first inlets 124, and when flipped vertically, FIGS. 5-7B also illustrate the second tubular ring 50, the second nozzles 52, 54, the second ring cavities 118, and the second inlets 126.

Figure 5:
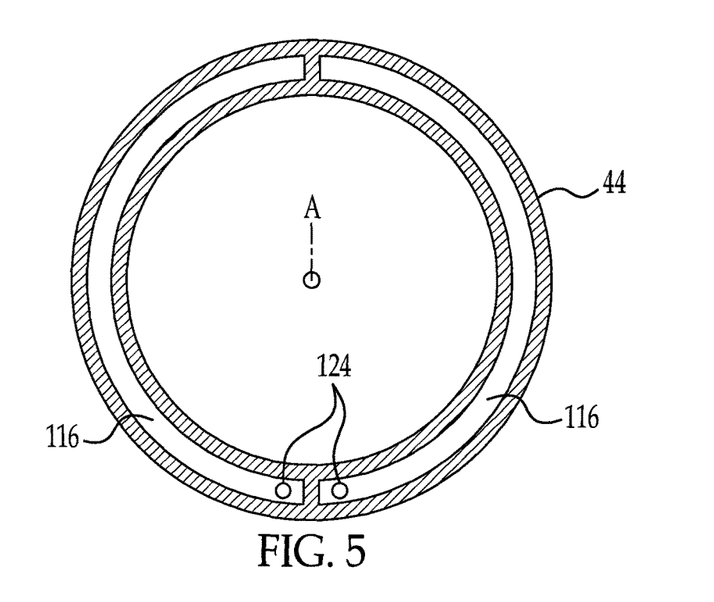
FIG. 5 is a top cross-sectional view of a tubular ring of the sensor assembly.
Figure 6:
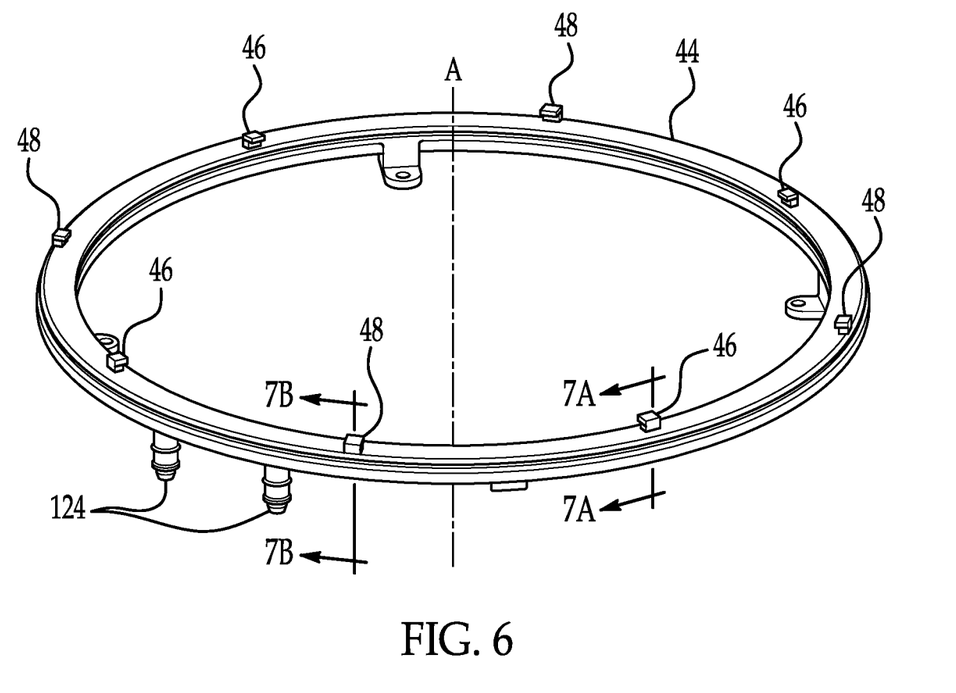
FIG. 6 is a perspective view of the tubular ring.

With reference to FIG. 5, the first tubular ring 44 includes at least one first ring cavity 116. The first ring cavities 116 are elongated circumferentially along the toroidal shape of the first tubular ring 44 and collectively extend 360° around the axis A. The second tubular ring 50 includes at least one second ring cavity 118. The second ring cavities 118 are elongated circumferentially along the toroidal shape of the second tubular ring 50 and collectively extend 360° around the axis A. With reference to FIGS. 5 and 6, a first inlet 124 is fluidly connected to each first ring cavity 116, and a second inlet 126 is fluidly connected to each second ring cavity 118. The first inlets 124 connect to the first tubular ring 44 from below the first tubular ring 44, and the second inlets 126 connect to the second tubular ring 50 from above the second tubular ring 50.

With reference to FIG. 6, the first tubular ring 44 includes the first nozzles 46, 48. The first nozzles 46, 48 include first first nozzles 46 and second first nozzles 48. The first first nozzles 46 and the second first nozzles 48 are arranged in an alternating pattern around the first tubular ring 44; i.e., each first first nozzle 46 is circumferentially adjacent to one second first nozzle 48 in each direction, and each second first nozzle 48 is circumferentially adjacent to one first first nozzle 46 in each direction. The first first nozzles 46 and second first nozzles 48 are substantially evenly spaced around the first tubular ring 44; i.e., the distance from each first or second first nozzle 46, 48 to the adjacent first or second first nozzle 46, 48 is substantially the same. The first first nozzles 46 can include four first first nozzles 46, and the second first nozzles 48 can include four second first nozzles 48.

The second tubular ring 50 includes the second nozzles 52, 54. The second nozzles 52, 54 include first second nozzles 52 and second second nozzles 54. The first second nozzles 52 and the second second nozzles 54 are arranged in an alternating pattern around the second tubular ring 50; i.e., each first second nozzle 52 is circumferentially adjacent to one second second nozzle 54 in each direction, and each second second nozzle 54 is circumferentially adjacent to one first second nozzle 52 in each direction. The first second nozzles 52 and second second nozzles 54 are substantially evenly spaced around the second tubular ring 50; i.e., the distance from each first or second second nozzle 52, 54 to the adjacent first or second second nozzle 52, 54 is substantially the same. The first second nozzles 52 can include four first second nozzles 52, and the second second nozzles 54 can include four second second nozzles 54.

The first ring cavities 116 are fluidly connected to the first nozzles 46, 48, and the second ring cavities 118 are fluidly connected to the second nozzles 52, 54. Each first ring cavity 116 is fluidly connected to a subset of the first nozzles 46, 48, and each first nozzle 46, 48 is connected to one of the first ring cavities 116. Each second ring cavity 118 is fluidly connected to a subset of the second nozzles 52, 54, and each second nozzle 52, 54 is connected to one of the second ring cavities 118.

Figure 7A:
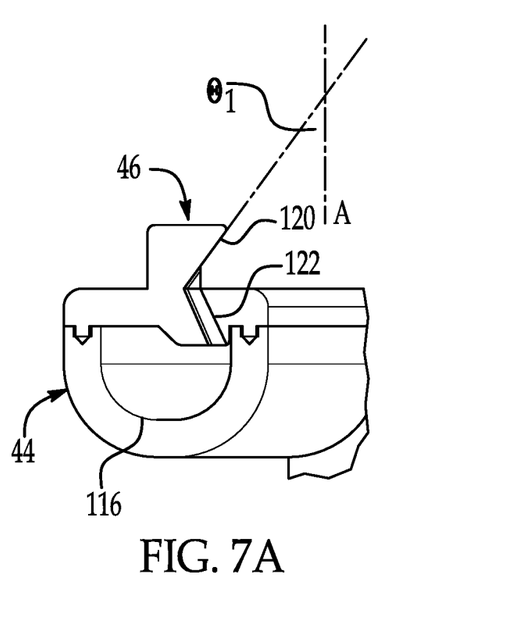
FIG. 7A is a side cross-sectional view of the tubular ring.
Figure 7B:
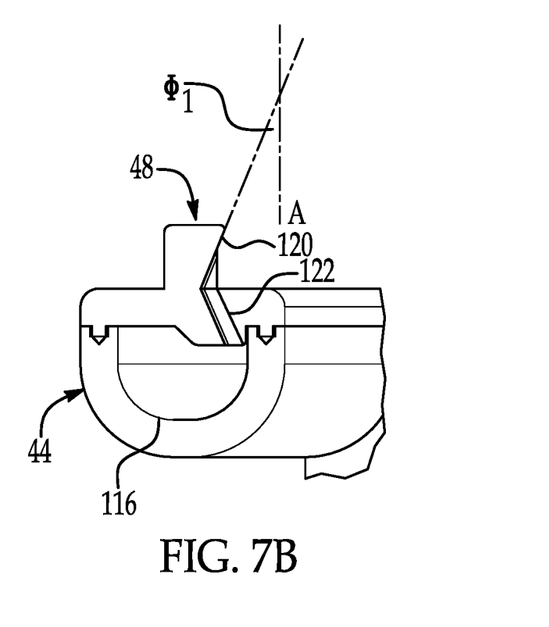
FIG. 7B is another side cross-sectional view of the tubular ring.

With reference to FIGS. 7A-B, the first nozzles 46, 48 and second nozzles 52, 54 are liquid nozzles. The first nozzles 46, 48 and second nozzles 52, 54 are shaped to spray fluid in a flat-fan pattern, as shown in FIG. 2. The first nozzles 46, 48 and second nozzles 52, 54 each include a deflection surface 120, which is flat, and an outlet 122 directed at the respective deflection surface 120. Fluid exiting one of the first ring cavities 116 or second ring cavities 118 through one of the outlets 122 hits the respective deflection surface 120 and spreads out into the flat-fan pattern defined by the deflection surface 120.

The first nozzles 46, 48 are aimed at the first cylindrical sensor window 36. The first first nozzles 46 each have a direction of discharge in a radially inward and axial direction, i.e., a direction that is toward the axis A and along the axis A, e.g., toward the axis A and upward, forming a first angle $\theta_1$ with the axis A. The second first nozzles 48 each have a direction of discharge in a radially inward and axial direction forming a second angle $\varphi_1$ with the axis A. The second angle $\varphi_1$ is different than the first angle $\theta_1$. The deflection surfaces 120 of the first first nozzles 46 each define the first angle $\theta_1$ with the axis A, and the deflection surfaces 120 of the second first nozzles 48 each define the second angle $\varphi_1$ with the axis A.

The second nozzles 52, 54 are aimed at the second cylindrical sensor window 42. The first second nozzles 52 each have a direction of discharge in a radially inward and axial direction, i.e., a direction that is toward the axis A and along the axis A, e.g., toward the axis A and downward, forming a first angle $\theta_2$ with the axis A. The second second nozzles 54 each have a direction of discharge in a radially inward and axial direction forming a second angle $\varphi_2$ with the axis A. The second angle $\varphi_2$ is different than the first angle $\theta_2$. The deflection surfaces 120 of the first second nozzles 52 each define the first angle $\theta_2$ with the axis A, and the deflection surfaces 120 of the second second nozzles 54 each define the second angle $\varphi_2$ with the axis A.

In operation, the liquid cleaning system 106 can be activated, e.g., when the first cylindrical sensor window 36 or the second cylindrical sensor window 42 becomes dirty or obstructed, at regular intervals, or based on other triggers. The pump 110 forces washer fluid through the first inlets 124 to the first ring cavities 116 and through the second inlets 126 to the second ring cavities 118. The valves 114 can be activated so that washer fluid is pumped to only one of the first ring cavities 116 or to one of the second ring cavities 118, e.g., if the obstruction on one of the first cylindrical sensor window 36 or the second cylindrical sensor window 42, and/or is on only one side of the first cylindrical sensor window 36 or second cylindrical sensor window 42. The washer fluid passing through the first first nozzles 46 is directed at the first cylindrical sensor window 36 at the first angle $\theta_1$, and the washer fluid passing through the second first nozzles 48 is directed at the first cylindrical sensor window 36 at the second angle $\varphi_1$. The washer fluid from the second first nozzles 48 lands on the first cylindrical sensor window 36 higher than the washer fluid from the first first nozzles 46, providing good vertical coverage of the first cylindrical sensor window 36. The washer fluid passing through the first second nozzles 52 is directed at the second cylindrical sensor window 42 at the first angle $\theta_2$, and the washer fluid passing through the second second nozzles 54 is directed at the second cylindrical sensor window 42 at the second angle $\varphi_2$. The washer fluid from the second second nozzles 54 lands on the second cylindrical sensor window 42 lower than the washer fluid from the first second nozzles 52, providing good vertical coverage of the second cylindrical sensor window 42. The air cleaning system 94 can be activated, e.g., to dry the cylindrical sensor windows 36, 42 after use of the liquid cleaning system 106.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor assembly comprising:
   a first sensor including a first cylindrical sensor window defining an axis;
   an annular member substantially centered around the axis, fixed relative to the first sensor, and supporting the first sensor;
   a second sensor fixed relative to the annular member and suspended from the annular member, the second sensor including a second cylindrical sensor window defining the axis;
   a first tubular ring fixed relative to the annular member and substantially centered around the axis, the first tubular ring including a plurality of first nozzles aimed at the first cylindrical sensor window;
   a second tubular ring fixed relative to the annular member and substantially centered around the axis, the second tubular ring including a plurality of second nozzles aimed at the second cylindrical sensor window; and
   two legs extending downward from the annular member at respective points above the second sensor to respective points below the second sensor;
   wherein the legs support a full weight of the first sensor, the second sensor, and the annular member; and
   the legs are circumferentially spaced from each other around the axis.

2. The sensor assembly of claim 1, wherein the legs are disposed 180° circumferentially from one another relative to the axis.

3. The sensor assembly of claim 2, further comprising a housing supporting the legs and defining a vehicle-forward direction, wherein the legs are disposed in a cross-vehicle direction from the axis.

4. The sensor assembly of claim 1, further comprising a housing supporting the legs, wherein the legs are elongated from the housing to the annular member, and the second sensor includes a bottom surface facing toward the housing and spaced from the housing.

5. The sensor assembly of claim 1, wherein the first tubular ring is disposed below the first cylindrical sensor window, and the second tubular ring is disposed above the second cylindrical sensor window.

6. The sensor assembly of claim 1, wherein the first tubular ring includes a first ring cavity fluidly connected to the first nozzles, and the second tubular ring includes a second ring cavity fluidly connected to the second nozzles.

7. The sensor assembly of claim 6, further comprising a supply line fluidly connected to the first ring cavity, wherein one of the legs includes a leg cavity, and the supply line extends through the leg cavity.

8. The sensor assembly of claim 7, further comprising a reservoir spaced from the legs, and a pump positioned to draw fluid from the reservoir and supply the fluid through the supply line.

9. The sensor assembly of claim 1, further comprising wiring electrically connected to the first sensor and to the second sensor, wherein one of the legs includes a leg cavity, and the wiring extends through the leg cavity.

10. The sensor assembly of claim 1, wherein the first sensor includes a top surface and a plurality of first fins extending upward from the top surface, the second sensor includes a bottom surface and a plurality of second fins extending downward from the bottom surface, and the first fins and the second fins have a thermal conductivity equal to at least 15 watts per meter-Kelvin (W/(m K)) at 25° C.

11. The sensor assembly of claim 10, further comprising a housing supporting the legs and defining a vehicle-forward direction, wherein the first fins and the second fins are elongated along the vehicle-forward direction.

12. The sensor assembly of claim 1, wherein the first nozzles include first first nozzles and second first nozzles arranged in an alternating pattern around the first tubular ring, the first first nozzles each have a direction of discharge in a radially inward and axial direction forming a first angle with the axis, the second first nozzles each have a direction of discharge in a radially inward and axial direction forming a second angle with the axis, and the second angle is different than the first angle.

13. The sensor assembly of claim 1, wherein the second nozzles include first second nozzles and second second nozzles arranged in an alternating pattern around the second tubular ring, the first second nozzles each have a direction of discharge in a radially inward and axial direction forming a first angle with the axis, the second second nozzles each have a direction of discharge in a radially inward and axial direction forming a second angle with the axis, and the second angle is different than the first angle.

14. The sensor assembly of claim 1, wherein the first and second nozzles are shaped to spray fluid in a flat-fan pattern.

15. The sensor assembly of claim 1, wherein the first and second nozzles each include a flat deflection surface and an outlet directed at the respective deflection surface.

16. The sensor assembly of claim 1, wherein the first nozzles are substantially evenly spaced around the first tubular ring, and the second nozzles are substantially evenly spaced around the second tubular ring.

17. The sensor assembly of claim 1, further comprising first air nozzles positioned to discharge upward between the first tubular ring and the first cylindrical sensor window, and second air nozzles positioned to discharge downward between the second tubular ring and the second cylindrical sensor window.

18. The sensor assembly of claim 17, wherein the first and second air nozzles are oriented to discharge in directions parallel to the axis.

* * * * *